(12) United States Patent
Imaoka

(10) Patent No.: US 9,071,717 B2
(45) Date of Patent: Jun. 30, 2015

(54) ELECTRONIC APPARATUS

(71) Applicant: KYOCERA Document Solutions Inc., Osaka-shi, Osaka (JP)

(72) Inventor: Kunio Imaoka, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/495,982

(22) Filed: Sep. 25, 2014

(65) Prior Publication Data

US 2015/0092212 A1    Apr. 2, 2015

(30) Foreign Application Priority Data

Sep. 27, 2013    (JP) ................................. 2013-201422

(51) Int. Cl.
     *G06K 15/00*      (2006.01)
     *H04N 1/00*      (2006.01)

(52) U.S. Cl.
     CPC ........ *H04N 1/00896* (2013.01); *G06K 15/4055* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,177,739 B1 * | 1/2001 | Matsudaira et al. | 307/125 |
| 7,120,372 B2 * | 10/2006 | Kim et al. | 399/70 |
| 7,433,620 B2 * | 10/2008 | Sekiguchi et al. | 399/70 |
| 8,126,351 B2 * | 2/2012 | Ishizuka | 399/88 |
| 8,322,711 B2 * | 12/2012 | Hayama et al. | 271/162 |
| 8,547,567 B2 * | 10/2013 | Manabe | 358/1.14 |
| 8,720,881 B2 * | 5/2014 | Yamaguchi | 271/9.06 |
| 8,924,757 B2 * | 12/2014 | Itou | 713/323 |
| 8,941,858 B2 * | 1/2015 | Mikashima | 358/1.14 |
| 2006/0018678 A1 * | 1/2006 | Sekiguchi et al. | 399/70 |
| 2011/0064504 A1 * | 3/2011 | Kusumoto | 400/582 |
| 2012/0049439 A1 | 3/2012 | Hayama et al. | |
| 2012/0287467 A1 * | 11/2012 | Yamano | 358/1.15 |
| 2013/0088079 A1 | 4/2013 | Kim | |
| 2013/0120779 A1 | 5/2013 | Baba et al. | |
| 2013/0205156 A1 * | 8/2013 | Niitsuma | 713/324 |
| 2013/0219198 A1 | 8/2013 | Kuroishi et al. | |
| 2013/0222833 A1 | 8/2013 | Hirano | |
| 2014/0161476 A1 * | 6/2014 | Miyahara | 399/45 |
| 2014/0241745 A1 * | 8/2014 | Imaoka | 399/67 |

\* cited by examiner

FOREIGN PATENT DOCUMENTS

JP      2012-53214      3/2012

OTHER PUBLICATIONS

European Patent Appl. 14 00 3334.1—Search Report issued Feb. 26, 2015.

*Primary Examiner* — Dung Tran
(74) *Attorney, Agent, or Firm* — Gerald E. Hespos; Michael J. Porco; Matthew T. Hespos

(57) ABSTRACT

Provided is Electronic apparatus having a function of first power mode and a function of second power mode where power consumption is smaller than first power mode. A plurality of detecting units detects a plurality of trigger operations in second power mode, each of the trigger operations serving as a trigger that causes Electronic apparatus to return from second power mode to first power mode. Mode switching unit causes Electronic apparatus to return from second power mode to first power mode when any one of the plurality of trigger operations is detected by the plurality of detecting units. Power control unit supplies power to the plurality of detecting units in second power mode while performing control of repeating a supply period where power is supplied to the detecting unit and a non-supply period where power is not supplied to it in respect to each of the plurality of detecting units.

9 Claims, 6 Drawing Sheets

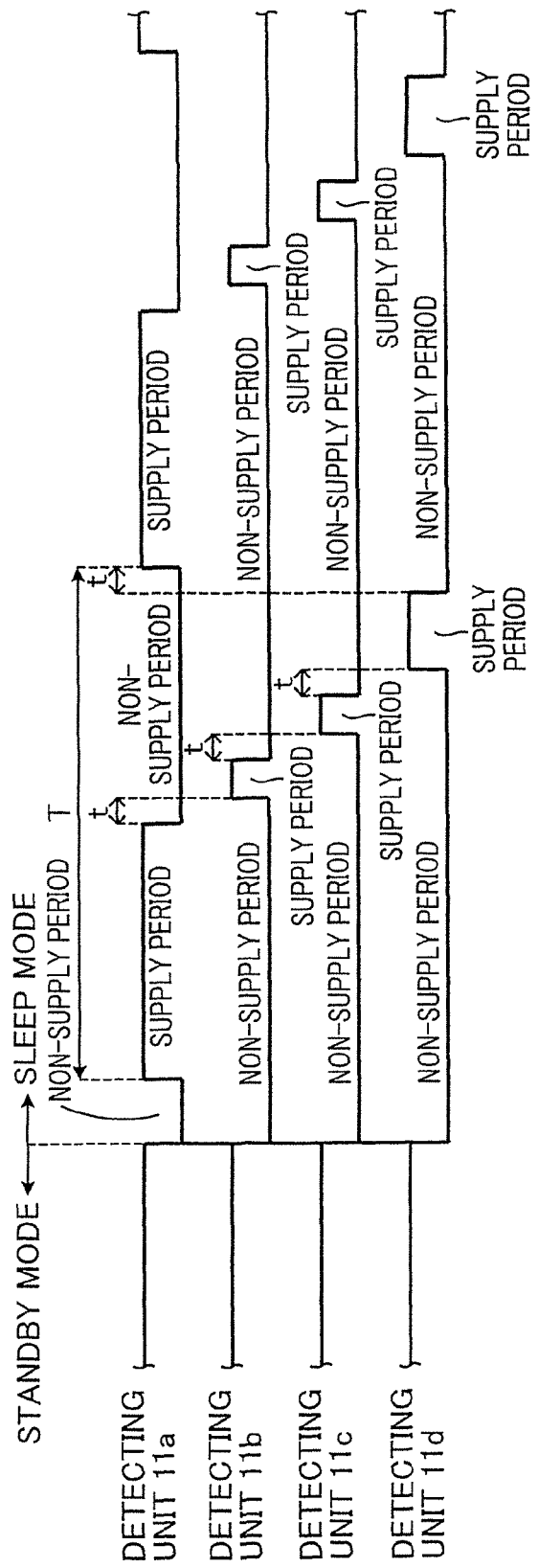

ELECTRONIC APPARATUS

This application claims priority to Japanese Patent Application No. 2013-201422 filed on Sep. 27, 2013, the contents of which are hereby incorporated by reference into the present application.

BACKGROUND

The present disclosure relates to an electronic apparatus having the function of a power mode such as a sleep mode where power consumption is small.

An electronic apparatus having the function of a sleep mode to save energy is known. For example, the image forming apparatus enters into a sleep mode when the apparatus is not operated for a predetermined period or a sleep mode key is operated.

In order to decrease power consumption in the sleep mode, an image forming apparatus capable of suppressing power consumption required for detecting opening and closing of a sheet cassette in the sleep mode is proposed. This image forming apparatus includes a vibration sensor that outputs a detection signal corresponding to a vibration pattern, a sheet cassette that stores a recording sheet, is opened and closed by removing and inserting the same and generates a predetermined vibration pattern when opened and closed, and an opening and closing detecting unit that detects opening and closing of the sheet cassette when the predetermined vibration pattern is detected based on the detection signal of the vibration sensor.

SUMMARY

An electronic apparatus according to an aspect of the present disclosure is an electronic apparatus having a function of a first power mode and a function of a second power mode where power consumption is smaller than the first power mode, including a plurality of detecting units, a mode switching unit, and a power control unit. The plurality of detecting units detects a plurality of trigger operations in the second power mode, each of the trigger operations serving as a trigger that causes the electronic apparatus to return from the second power mode to the first power mode. The mode switching unit causes the electronic apparatus to return from the second power mode to the first power mode when any one of the plurality of trigger operations is detected by the plurality of detecting units. The power control unit supplies power to the plurality of detecting units in the second power mode while performing control of repeating a supply period where power is supplied to the detecting unit and a non-supply period where power is not supplied to the detecting unit in respect to each of the plurality of detecting units.

BRIEF DESCRIPTION OF THE DRAWINGS

FIG. 6 is a timing chart illustrating a third example of an operation of a power control unit supplying power to each of four detecting units.

DETAILED DESCRIPTION

The present disclosure has been invented from the following perspectives. An electronic apparatus having a function of automatically returning from a sleep mode without operating a key on an operation panel in the sleep mode is known. For example, an image forming apparatus which includes a detecting unit like a sensor that detects an operation of removing and inserting a sheet cassette and which has a function of automatically returning from a sleep mode when the sheet cassette is pulled out in the sleep mode is known.

Besides the cassette pulling operation, a plurality of trigger operations serving as a trigger that causes the apparatus to automatically return from the sleep mode is defined, and a detecting unit that detects such trigger operations is provided.

However, it is necessary to supply power to the detecting unit that detects the trigger operations in the sleep mode. The number of detecting units increases with an increase in the number of trigger operations, which may become a hindrance to decreasing the power consumption of the image forming apparatus in the sleep mode.

An object of the present disclosure is to provide an electronic apparatus capable of decreasing power supplied to a plurality of detecting units that detects a plurality of trigger operations for causing the electronic apparatus to return from a power mode where power consumption is small.

Figure 1:
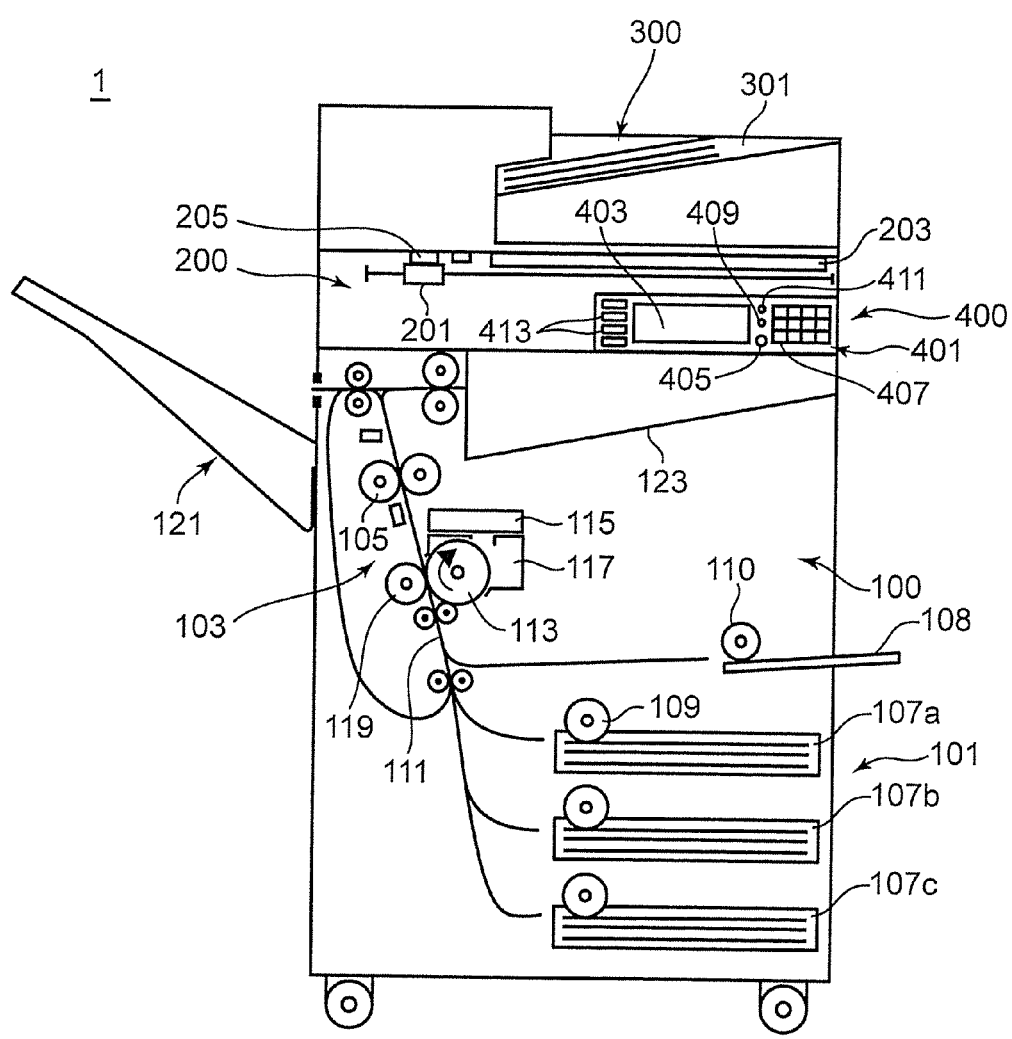
FIG. 1 is a diagram illustrating a schematic internal structure of an image forming apparatus (electronic apparatus) according to the present embodiment.

Hereinafter, an embodiment of the present disclosure will be described in detail based on the drawings. FIG. 1 is a diagram illustrating a schematic internal structure of an image forming apparatus 1 according to an embodiment of the present disclosure. The image forming apparatus 1 which is an electronic apparatus can be applied to a digital multifunctional machine having the functions of a copier, a printer, a scanner, and a facsimile, for example. The image forming apparatus 1 includes a main body 100, a document reading unit 200 disposed on the main body 100, a document feeding unit 300 disposed on the document reading unit 200, and an operating unit 400 disposed on a front surface above the main body 100.

The document feeding unit 300 functions as an automatic document feeding unit and is configured to feed a plurality of pages of documents placed on a document mount 301 so that the document reading unit 200 can read the documents successively.

The document reading unit 200 includes a carriage 201 having an exposure lamp or the like mounted thereon, a document table 203 formed of a transparent member such as glass, a charge coupled device (CCD) sensor (not illustrated), and a document reading slit 205. When a document placed on the document table 203 is read, the document is read by the CCD sensor while moving the carriage 201 in a longitudinal direction of the document table 203. In contrast, when a document feed from the document feeding unit 300 is read, the carriage 201 is moved to a position where the carriage 201 faces the document reading slit 205 and the document fed from the document feeding unit 300 is read by the CCD sensor through the document reading slit 205. The CCD sensor outputs the read document as image data.

The main body 100 includes a sheet storage unit 101, a manual tray 108, an image forming unit 103, and a fixing unit 105. The sheet storage unit 101 is disposed in a lowermost portion of the main body 100 and includes three sheet cassettes 107a, 107b, and 107c capable of storing a bunch of sheet. A sheet at top of the bunch of sheet stored in a sheet cassette selected among the sheet cassettes 107a, 107b, and 107c is delivered toward a sheet conveying path 111 with driving of a pickup roller 109. The sheet is conveyed to the image forming unit 103 through the sheet conveying path 111.

The manual tray 108 is attached to one side surface of the main body 100. A sheet set on the manual tray 108 is delivered toward the sheet conveying path 111 with driving of a feeding roller 110. The sheet is conveyed to the image forming unit 103 through the sheet conveying path 111.

The image forming unit 103 forms a toner image on the conveyed sheet. The image forming unit 103 includes a photosensitive drum 113, an exposing unit 115, a developing unit 117, and a transferring unit 119. The exposing unit 115 generates light modulated according to image data (for example, image data output from the document reading unit 200, image data transmitted from a PC, image data received by a facsimile, or the like) and irradiates a circumferential surface of the photosensitive drum 113 which is uniformly charged. In this way, an electrostatic latent image corresponding to the image data is formed on the circumferential surface of the photosensitive drum 113. Toner is supplied from the developing unit 117 to the circumferential surface of the photosensitive drum 113 in this state, whereby a toner image corresponding to the image data is formed on the circumferential surface. The transferring unit 119 transfers this toner image to a sheet conveyed from the sheet storage unit 101 or the manual tray 108 described above.

The sheet to which the toner image is transferred is delivered to the fixing unit 105. The fixing unit 105 applies heat and pressure to the toner image and the sheet whereby the toner image is fixed to the sheet. The sheet is discharged to a stack tray 121 or a discharge tray 123.

The operating unit 400 includes an operating key unit 401 and a display unit 403. The display unit 403 has a touch panel function and a screen including soft keys. Users make settings or the like necessary for executing a function such as copying by operating the soft keys while looking at the screen.

The operating key unit 401 includes operation keys configured as hard keys. Specifically, the operation keys include a start key 405, a numeric keypad 407, a stop key 409, a reset key 411, and a function switching key 413 for switching between a copier, a printer, a scanner, and a facsimile.

The start key 405 is a key for starting operations such as facsimile transmission. The numeric keypad 407 is a key for inputting a number such as a copy count or a facsimile number. The stop key 409 is a key for stopping a copying operation or the like. The reset key 411 is a key for restoring set content to an initial setting state.

The function switching key 413 includes a copy key, a send key, and the like and is a key for switching between a copying function, a facsimile function, and other functions. When a copy key is operated, an initial screen for a copying function is displayed on the display unit 403. When a send key is operated, an initial screen for a facsimile transmission function and a mail transmission function is displayed on the display unit 403.

Figure 2:
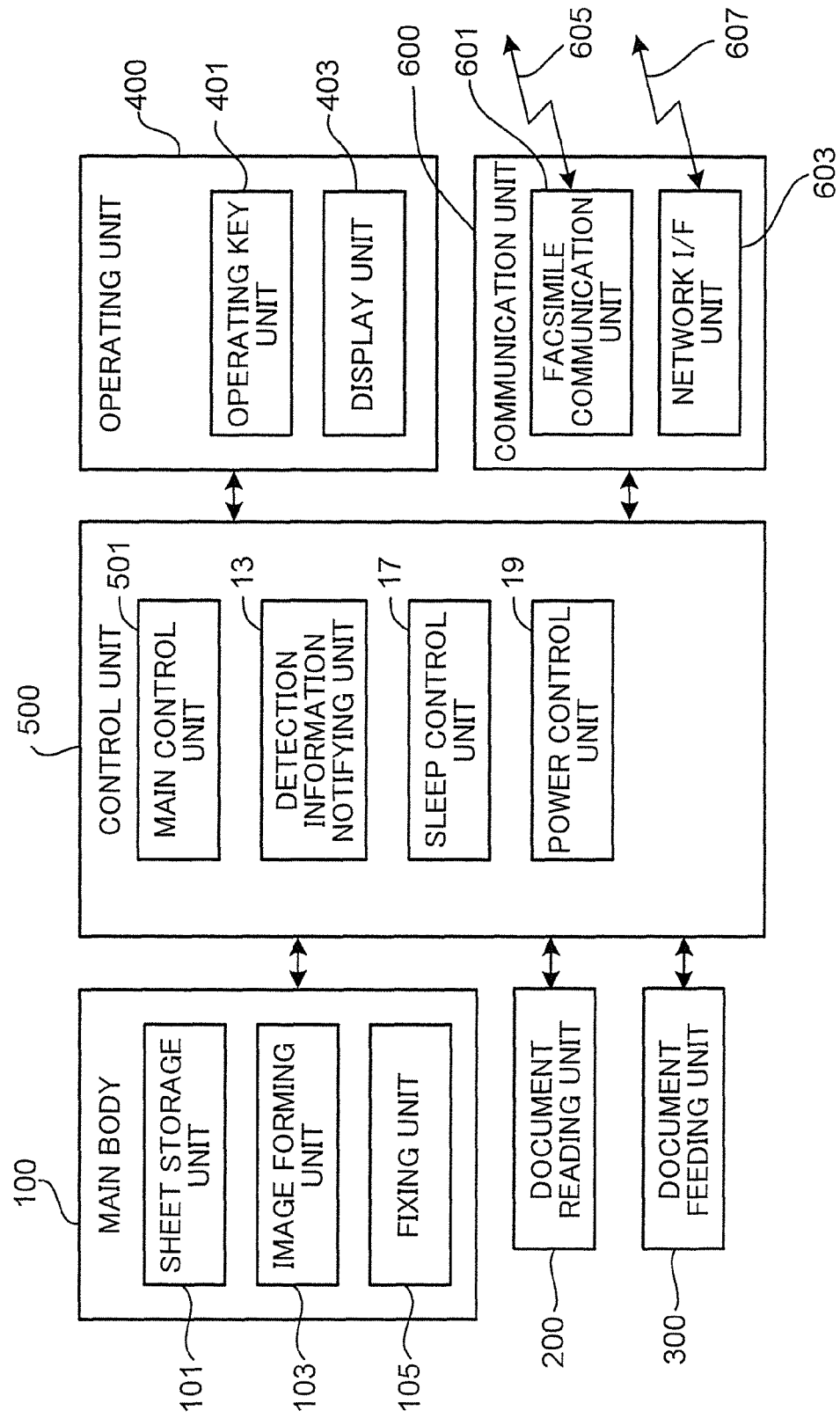
FIG. 2 is a block diagram illustrating a configuration of the image forming apparatus illustrated in FIG. 1.

FIG. 2 is a block diagram illustrating a configuration of the image forming apparatus 1 illustrated in FIG. 1. The image forming apparatus 1 has a configuration in which the main body 100, the document reading unit 200, the document feeding unit 300, the operating unit 400, a control unit 500, and a communication unit 600 are connected to each other by a bus.

Since the main body 100, the document reading unit 200, the document feeding unit 300, and the operating unit 400 have been described, description thereof will not be provided.

The control unit 500 includes a central processing unit (CPU), a read only memory (ROM), a random access memory (RAM), and an image memory. The CPU executes control required for operating the image forming apparatus 1 with respect to the constituent components of the image forming apparatus 1 such as the main body 100. The ROM stores software required for controlling the operations of the image forming apparatus 1. The RAM is used for temporarily storing data generated during execution of software and storing application software. The image memory temporarily stores image data (for example, image data output from the document reading unit 200, image data transmitted from a PC, image data received by a facsimile, or the like).

The control unit 500 includes a main control unit 501, a detection information notifying unit 13, a sleep control unit 17, and a power control unit 19 as its functional blocks. These blocks will be described later.

The communication unit 600 includes a facsimile communication unit 601 and a network I/F unit 603. The facsimile communication unit 601 includes a network control unit (NCU) that controls connection of a telephone line with a counterpart facsimile and a modem circuit that modulates and demodulates facsimile communication signals. The facsimile communication unit 601 is connected to a telephone line 605.

The network I/F unit 603 is connected to a local area network (LAN) 607. The network I/F unit 603 is a communication interface circuit for executing communication with a terminal device such as a PC connected to the LAN 607.

Figure 3:
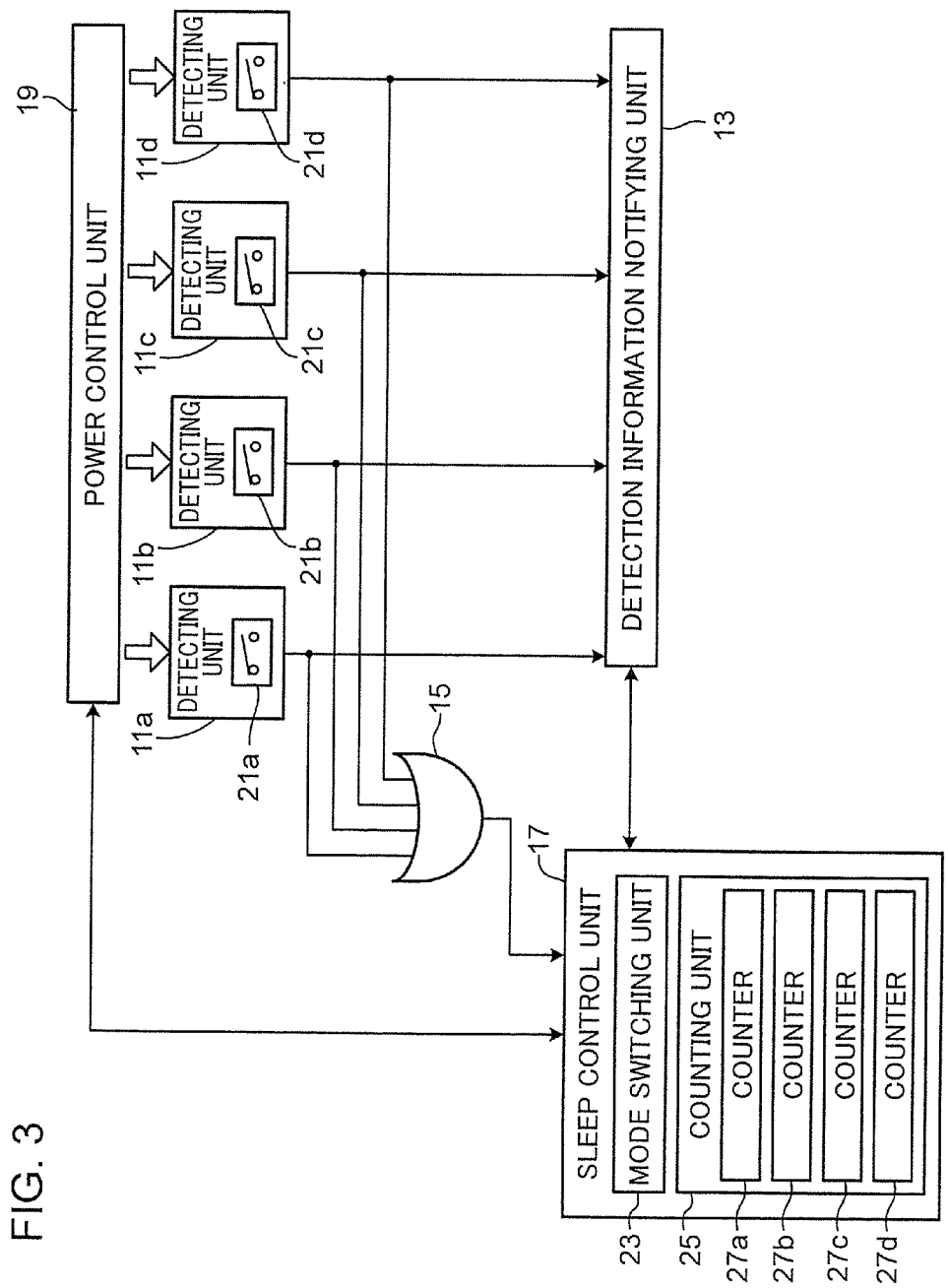
FIG. 3 is a block diagram illustrating constituent components associated with detection of trigger operations in the image forming apparatus according to the present embodiment.

FIG. 3 is a block diagram illustrating constituent components associated with detection of trigger operations in the image forming apparatus 1 according to the present embodiment. A trigger operation is an operation that serves as a trigger that causes the image forming apparatus 1 to return from a sleep mode to a standby mode. In the present embodiment, an operation of pulling the sheet cassette 107a from the sheet storage unit 101 illustrated in FIG. 1, an operation of pulling the sheet cassette 107b from the sheet storage unit 101, an operation of pulling the sheet cassette 107c from the sheet storage unit 101, an operation of setting a sheet on the manual tray 108 will be described as the trigger operation. The trigger operation is not limited to these four operations but may include an operation of opening and closing a front cover (not illustrated) of the image forming apparatus 1.

The standby mode is a mode where the temperature of a fixing roller (not illustrated) of the fixing unit 105 in FIG. 1 is lower than a toner melting temperature and preparations for image formation are completed. In the standby mode, an operation screen is displayed on the display unit 403.

The sleep mode is a mode where the fixing roller of the fixing unit 105 is not heated but the fixing roller is at a room temperature. In the sleep mode, the operation screen is not displayed on the display unit 403.

In the present embodiment, the standby mode is referred to as a first power mode, and the sleep mode is referred to as a second power mode where the power consumption is smaller than in the first power mode. However, the first power mode is not limited to the standby mode, and the second power mode is not limited to the sleep mode.

The image forming apparatus 1 includes detecting units 11a, 11b, 11c, and 11d, the detection information notifying unit 13, an OR circuit 15, the sleep control unit 17, and the power control unit 19 as constituent components associated with detection of trigger operations. First, the detecting units 11a, 11b, 11c, and 11d will be described. These detecting units will be described as a detecting unit 11 if it is not necessary to distinguish the detecting units from each other.

The detecting unit 11 detects a trigger operation using a switch. The detecting unit 11 amplifies a signal generated when the switch is turned on and off and outputs the amplified signal. It is necessary to supply power to the detecting unit 11 in order to operate the detecting unit 11.

Although an example in which four detecting units 11 are provided is described, the number of detecting units 11 is not limited to four. Although an example in which the detecting unit 11 which uses a switch is described as an example of the detecting unit 11, the detecting unit 11 is not limited to this, and a detecting unit 11 which uses an optical sensor such as a photo interrupter may be used.

The detecting unit 11a detects an operation (trigger operation) of pulling the sheet cassette 107a from the sheet storage unit 101 of FIG. 1 in the sleep mode and detects a state where the sheet cassette 107a is inserted into the sheet storage unit 101 in the standby mode.

The detecting unit 11b detects an operation (trigger operation) of pulling the sheet cassette 107b from the sheet storage unit 101 of FIG. 1 in the sleep mode and detects a state where the sheet cassette 107b is inserted into the sheet storage unit 101 in the standby mode.

The detecting unit 11c detects an operation (trigger operation) of pulling the sheet cassette 107c from the sheet storage unit 101 of FIG. 1 in the sleep mode and detects a state where the sheet cassette 107c is inserted into the sheet storage unit 101 in the standby mode.

The operations of the detecting units 11a, 11b, and 11c are the same, and the operations of these detecting units will be described using the detecting unit 11a. A switch 21a of the detecting unit 11a is turned on when the sheet cassette 107a is inserted into the sheet storage unit 101, and the switch 21a of the detecting unit 11a is turned off when the sheet cassette 107a is pulled from the sheet storage unit 101.

When a signal indicating that the state of the switch 21a of the detecting unit 11a is changed from the on-state to the off-state is output from the detecting unit 11 in the sleep mode, it means that the detecting unit 11a has detected the operation of pulling the sheet cassette 107a from the sheet storage unit 101.

When a signal indicating that the switch 21a of the detecting unit 11a is in the on-state is output from the detecting unit 11a in the standby mode, it means that the detecting unit 11a has detected a state where the sheet cassette 107a is inserted into the sheet storage unit 101. When a signal indicating that the switch 21a of the detecting unit 11a is in the off-state is output from the detecting unit 11a in the standby mode, it means that the detecting unit 11a has detected a state where the sheet cassette 107a is not inserted into the sheet storage unit 101.

The detecting unit 11d detects an operation (trigger operation) of setting a sheet on the manual tray 108 in the sleep mode and detects a state where a sheet is set on the manual tray 108 in the standby mode. A switch 21d of the detecting unit 11d is turned on when a sheet is set on the manual tray 108, and the switch 21d of the detecting unit 11d is turned off when a sheet is not set on the manual tray 108.

When a signal indicating that the state of the switch 21d of the detecting unit 11d is changed from the off-state to the on-state is output from the detecting unit 11d in the sleep mode, it means that the detecting unit 11d has detected an operation of setting a sheet on the manual tray 108.

When a signal indicating that the switch 21d of the detecting unit 11d is in the on-state is output from the detecting unit 11d in the standby mode, it means that the detecting unit 11d has detected a state where a sheet is set on the manual tray 108. When a signal indicating that the switch 21d of the detecting unit 11d is in the off-state is output from the detecting unit 11d in the standby mode, it means that the detecting unit 11d has detected a state where a sheet is not set on the manual tray 108.

The signals output from the four detecting units 11 are input to the detection information notifying unit 13 and the OR circuit 15. A signal output from the OR circuit 15 is input to the sleep control unit 17.

The detection information notifying unit 13 is included in the control unit 500 in FIG. 2. In response to a request from the main control unit 501 that supervises the control of the entire image forming apparatus 1 in the standby mode, the detection information notifying unit 13 notifies the main control unit 501 of information indicating whether the sheet cassette 107a is inserted into the sheet storage unit 101, whether the sheet cassette 107b is inserted into the sheet storage unit 101, whether the sheet cassette 107c is inserted into the sheet storage unit 101, and whether a sheet is set on the manual tray 108.

The detection information notifying unit 13 operates in the standby mode but does not operate in the sleep mode. Thus, power is supplied to the detection information notifying unit 13 in the standby mode but no power is supplied thereto in the sleep mode. The detection information notifying unit 13 transitions from the standby mode to the sleep mode and from the sleep mode to the standby mode according to the control of the sleep control unit 17.

The sleep control unit 17 is included in the control unit 500 in FIG. 2. The sleep control unit 17 causes the image forming apparatus 1 to return to the standby mode from the sleep mode when a trigger operation occurs in the sleep mode. Since the sleep control unit 17 operates in both the standby mode and the sleep mode, power is always supplied to the sleep control unit 17.

The sleep control unit 17 includes a mode switching unit 23 and a counting unit 25. When any one of the four detecting units 11 detects a trigger operation in the sleep mode, the detection signal is transmitted to the sleep control unit 17 via the OR circuit 15. As a result, the mode switching unit 23 causes the image forming apparatus 1 to return to the standby mode from the sleep mode. The main control unit 501 in FIG. 2 executes processes in the standby mode such as displaying the operation screen on the display unit 403.

The signal output from the OR circuit 15 is not sufficient for determining which one of the detecting units 11 has transmitted the detection signal. Thus, the sleep control unit 17 transmits a request to the detection information notifying unit 13. In response to the request from the sleep control unit 17, the detection information notifying unit 13 notifies the sleep control unit 17 of information indicating which one of the four detecting units 11 has detected the trigger operation. This notification is counted by the counting unit 25 described below.

The counting unit 25 counts the number of trigger operations detected by each of the four detecting units 11. The counting unit 25 includes counters 27a, 27b, 27c, and 27d. The counter 27a counts the number of trigger operations detected by the detecting unit 11a. The counter 27b counts the number of trigger operations detected by the detecting unit 11b. The counter 27c counts the number of trigger operations detected by the detecting unit 11c. The counter 27d counts the number of trigger operations detected by the detecting unit 11d.

The sleep control unit 17 memorizes whether the sheet cassette 107a of FIG. 1 is pulled from the sheet storage unit 101 or is inserted into the sheet storage unit 101, whether the sheet cassette 107b is pulled from the sheet storage unit 101 or is inserted into the sheet storage unit 101, whether the sheet cassette 107c is pulled from the sheet storage unit 101 or is inserted into the sheet storage unit 101, and whether a sheet is set on the manual tray 108 or not. It is assumed that, when the control unit 500 executes a printing operation with a configuration that the manual tray 108 is not used, the sleep control unit 17 memorizes that the sheet cassettes 107a, 107b, and 107c are inserted into the sheet storage unit 101. In this case, since the main control unit 501 can execute a printing operation without checking the output from the detecting units 11a, 11b, and 11c, it is possible to shorten the printing time.

The power control unit 19 is a power control unit for detecting units and performs control of supplying power to the four detecting units 11. The power control unit 19 is included in the control unit 500 in FIG. 2. Since the power control unit 19 operates in both the standby mode and the sleep mode, power is always supplied to the power control unit 19.

Figure 4:
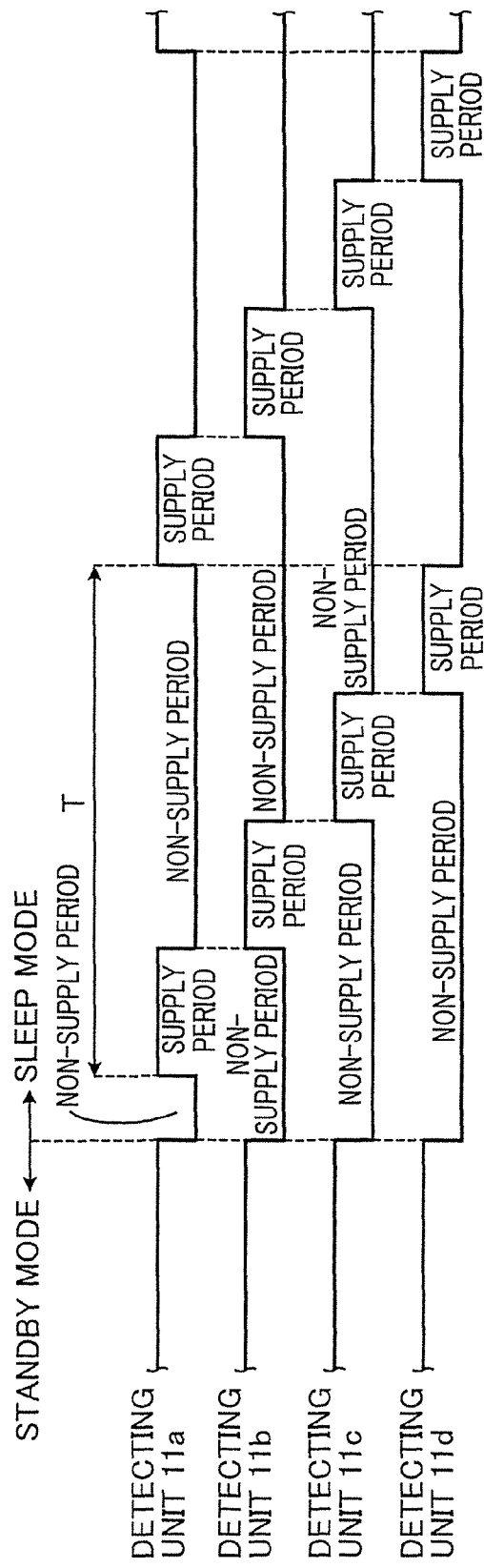
FIG. 4 is a timing chart illustrating a first example of an operation of a power control unit supplying power to each of four detecting units.
Figure 5:
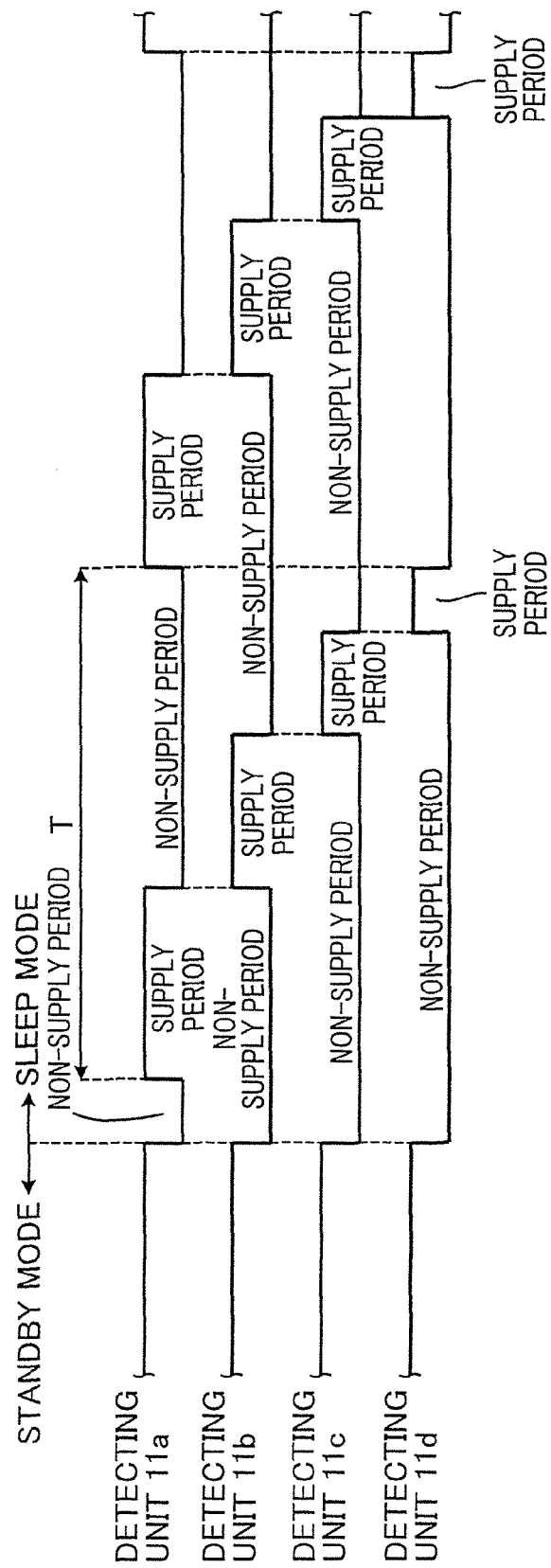
FIG. 5 is a timing chart illustrating a second example of an operation of a power control unit supplying power to each of four detecting units.

FIG. 4 is a timing chart illustrating a first example of an operation of the power control unit 19 supplying power to the four detecting units 11. FIG. 5 is a timing chart illustrating a second example of an operation of the power control unit 19 supplying power to the four detecting units 11. FIG. 6 is a timing chart illustrating a third example of an operation of the power control unit 19 supplying power to the four detecting units 11.

As illustrated in FIGS. 4 to 6, the power control unit 19 supplies power to the four detecting units 11 while performing control of repeating a supply period where power is supplied to each of the four detecting units 11 in the sleep mode and a non-supply period where power is not supplied thereto. This control can be said to be control of periodically repeating a supply period where power is supplied to each of the four detecting units 11 or control of supplying power thereto intermittently.

The power control unit 19 performs control of repeating a cycle T which includes one supply period of the detecting unit 11a, one supply period of the detecting unit 11b, one supply period of the detecting unit 11c, and one supply period of the detecting unit 11d.

The power control unit 19 supplies power to each of the four detecting units 11 continuously in the standby mode without providing a non-supply period.

The first example illustrated in FIG. 4 illustrates a case of the initial setting of the power control unit 19. This case has Features 1 and 2 below.
(Feature 1)
The power control unit 19 sets the supply periods so that the supply periods allocated to the four detecting units 11 are the same in the sleep mode.
(Feature 2)
In the sleep mode, the power control unit 19 is configured to: (1) start supplying power to the detecting unit 11a; (2) start supplying power to the detecting unit 11b at the ending point of the supply period of the detecting unit 11a; (3) start supplying power to the detecting unit 11c at the ending point of the supply period of the detecting unit 11b; (4) start supplying power to the detecting unit 11d at the ending point of the supply period of the detecting unit 11c; and (5) start supplying power to the detecting unit 11a at the ending point of the supply period of the detecting unit 11d. After that, the operations of (2) to (5) are repeated.

When a predetermined period (for example, several weeks, one month, or several months) has elapsed, the power control unit 19 changes the settings on the length of the supply period and the starting point of the supply period for each of the four detecting units 11 based on a trigger count counted by each of the counters 27a, 27b, 27c, and 27d of the counting unit 25.

It is assumed that the number of trigger operations detected by the detecting unit 11a is the largest, the number of trigger operations detected by the detecting unit 11b is the second largest, the number of trigger operations detected by the detecting unit 11c is the third largest, and the number of trigger operations detected by the detecting unit 11d is the smallest. FIG. 5 illustrates a case where the setting of the power control unit 19 is changed based on these assumptions. In this case, the power control unit 19 does not change the cycle T but changes the supply period allocated to the detecting unit 11a to be the longest, the supply period allocated to the detecting unit 11b to be the second longest, the supply period allocated to the detecting unit 11c to be the third longest, and the supply period allocated to the detecting unit 11d to be the shortest.

The case of FIG. 5 has Feature 2 similarly to the case illustrated in FIG. 4.

When a detecting unit 11 for which the number of trigger operations detected is smaller than a predetermined number is present (that is, a detecting unit 11 for which the number of trigger operations detected is extremely small is present), the supply period of the detecting unit 11 is set to a predetermined minimum period. It is assumed that the number of trigger operations detected by each of the detecting units 11b and 11c is smaller than a predetermined number.

FIG. 6 illustrates a case where the setting of the power control unit 19 is changed based on these assumptions. In this case, the power control unit 19 does not change the cycle T but sets a minimum period as the supply periods of the detecting units 11b and 11c. The supply periods of the detecting units 11a and 11d are set to be longer in ascending order of the number of trigger operations detected.

When the minimum period is set to the supply periods of the detecting units 11b and 11c, the power control unit 19 does not allocate a portion of the remaining period of the cycle T to the supply periods of the detecting units 11a and 11d. In this way, a period in which no power is supplied to any of the four detecting units 11 is created in the cycle T so that power consumption in the sleep mode decreases.

Major advantages of the present embodiment will be described with reference to FIGS. 4 to 6.

In the image forming apparatus 1 according to the present embodiment, power is supplied to the four detecting units 11 while performing control of repeating a supply period where power is supplied to the detecting unit 11 in the sleep mode and a non-supply period where power is not supplied to detecting unit 11 in respect to each of the four detecting units 11. Thus, it is possible to decrease power supplied to the four detecting units 11 in the sleep mode as compared to when power is continuously supplied to each of the four detecting units 11 in the sleep mode. In this manner, according to the present embodiment, it is possible to decrease power supplied to a plurality of detecting units 11 that detects a plurality of trigger operations for causing the electronic apparatus to return from a power mode where power consumption is small.

In the cycle T, if one detecting unit 11 is in the supply period, the remaining detecting units 11 are in the non-supply period. In this manner, the power control unit 19 supplies power to the four detecting units so that the supply periods of the four detecting units do not overlap mutually. Thus, since power is not supplied to two or more detecting units 11 simultaneously, even when the number of detecting units 11 increases, it is possible to suppress an increase in the power supplied to the entire plurality of detecting units 11.

The power control unit 19 may be configured to supply power so that the supply periods of two or more detecting units 11 overlap partially. In this case, it is also possible to decrease the power supplied to the four detecting units 11 in the sleep mode as compared to when power is continuously supplied to each of the four detecting units 11 in the sleep mode.

In the present embodiment, each of the four detecting units 11 has a non-supply period where no power is supplied thereto. When a trigger operation occurs in a non-supply period in a detecting unit 11 that detects the trigger operation, since the detecting unit 11 cannot detect the trigger operation immediately and the trigger operation is not detected until the next supply period, the detection is delayed. Thus, in the present embodiment, it may not be possible to detect a trigger operation immediately.

In the present embodiment, as illustrated in FIG. 5, the power control unit 19 supplies power to the four detecting units 11 so that the supply period allocated to each of the four detecting units 11 increases in ascending order of the number counted by the counting unit 25 of FIG. 3.

According to the present embodiment, since the supply period allocated to each of the four detecting units 11 increases in ascending order of the number of trigger operations detected, it is possible to decrease the probability that a detecting unit 11 for which the number of trigger operations detected is relatively large cannot detect a trigger operation immediately.

As illustrated in FIG. 6, when a detecting unit 11 (detecting units 11b and 11c) for which the number counted by the counting unit 25 in FIG. 3 is smaller than a predetermined number is present among the four detecting units 11, the power control unit 19 sets the supply period allocated to the detecting unit 11 to a predetermined minimum period and supplies power to the four detecting units 11 so that a period t where no power is supplied to any of the four detecting units 11 is created. In this way, it is possible to further decrease the power supplied to the four detecting units 11 in the sleep mode.

In the present embodiment, the four detecting units 11 detect a plurality of trigger operations different from the operation on the operating key unit 401 of the operating unit 400 in FIG. 1. When any one of the keys of the operating key unit 401 is operated in the sleep mode, the image forming apparatus 1 returns to the standby mode from the sleep mode. In many cases, the image forming apparatus 1 returns to the standby mode from the sleep mode in response to an operation on the operating key unit 401. Thus, in the present embodiment, power is always supplied to a detecting unit (not illustrated) that detects an operation on the operating key unit 401 in the sleep mode.

That is, referring to FIGS. 2 and 3, the image forming apparatus 1 further includes the operating unit 400 including the display unit 403 and another detecting unit that detects an operation on the operating unit 400 and is different from the plurality of detecting units 11. The mode switching unit 23 causes the image forming apparatus 1 to return to the standby mode from the sleep mode when an operation on the operating unit 400 is detected by the other detecting unit in the sleep mode. In the sleep mode, the power control unit 19 supplies power to the other detecting unit always.

For example, the detecting unit 11d illustrated in FIG. 3 is the other detecting unit. Power is always supplied to the detecting unit 11d, and a supply period allocated to the detecting unit 11d is not present. Thus, the counter 27d corresponding to the detecting unit 11d is not provided.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An electronic apparatus having a function of a first power mode and a function of a second power mode where power consumption is smaller than the first power mode, comprising:
    a plurality of detecting units that detects a plurality of trigger operations in the second power mode, each of the trigger operations serving as a trigger that causes the electronic apparatus to return from the second power mode to the first power mode;
    a mode switching unit that causes the electronic apparatus to return from the second power mode to the first power mode when any one of the plurality of trigger operations is detected by the plurality of detecting units; and
    a power control unit that supplies power to the plurality of detecting units in the second power mode while performing control of repeating a supply period where power is supplied to the detecting unit and a non-supply period where power is not supplied to the detecting unit in respect to each of the plurality of detecting units.

2. The electronic apparatus according to claim 1, wherein the power control unit supplies power to the plurality of detecting units so that the supply periods of the plurality of detecting units do not overlap mutually.

3. The electronic apparatus according to claim 1, further comprising:
    a counting unit that counts the number of trigger operations detected by each of the plurality of detecting units, wherein
    the power control unit supplies power to the plurality of detecting units so that the supply period allocated to each of the plurality of detecting units increases in ascending order of the number counted by the counting unit.

4. The electronic apparatus according to claim 1, further comprising:
    a counting unit that counts the number of trigger operations detected by each of the plurality of detecting units, wherein
    when a detecting unit for which the number counted by the counting unit is smaller than a predetermined number is present among the plurality of detecting units, the power control unit sets the supply period allocated to this detecting unit to a predetermined minimum period and supplies power to the plurality of detecting units so that a period where no power is supplied to any of the plurality of detecting units is created.

5. The electronic apparatus according to claim 1, further comprising:
    a counting unit that counts the number of trigger operations detected by each of the plurality of detecting units, wherein
    the power control unit is configured to:
    (a) supply power to the plurality of detecting units so that the supply periods allocated to the plurality of detecting units are the same in an initial setting; and
    (b) refer to the numbers counted by the counting unit when a predetermined period has elapsed, and supply power to the plurality of detecting units so that the supply period allocated to each of the plurality of detecting units increases in ascending order of the number.

6. The electronic apparatus according to claim 1, further comprising:
a counting unit that counts the number of trigger operations detected by each of the plurality of detecting units, wherein
the power control unit is configured to:
(a) supply power to the plurality of detecting units so that the supply periods allocated to the plurality of detecting units are the same in an initial setting; and
(b) refer to the numbers counted by the counting unit when a predetermined period has elapsed, and when a detecting unit for which the number counted by the counting unit is smaller than a predetermined number is present among the plurality of detecting units, set the supply period allocated to this detecting unit to a predetermined minimum period, and supply power to the plurality of detecting units so that a period where no power is supplied to any of the plurality of detecting units is created.

7. The electronic apparatus according to claim 1, further comprising:
a display unit that displays an operation screen of the electronic apparatus, wherein
the electronic apparatus executes a standby mode where the operation screen is displayed on the display unit as the first power mode, and executes a sleep mode where the operation screen is not displayed on the display unit as the second power mode.

8. The electronic apparatus according to claim 7, further comprising:
an operating unit that includes the display unit; and
another detecting unit that detects an operation on the operating unit and is different from the plurality of detecting units, wherein
the mode switching unit causes the electronic apparatus to return to the standby mode from the sleep mode when an operation on the operating unit is detected by the other detecting unit in the sleep mode, and
the power control unit supplies power to the other detecting unit always in the sleep mode.

9. The electronic apparatus according to claim 1, wherein the electronic apparatus is an image forming apparatus including an image forming unit that forms an image represented by image data on a sheet.

* * * * *